United States Patent
Lin et al.

(10) Patent No.: US 12,010,741 B2
(45) Date of Patent: Jun. 11, 2024

(54) COMMUNICATION METHOD, FIRST STATION, SECOND STATION, AND ACCESS POINT

(71) Applicant: HUAWEI TECHNOLOGIES CO., LTD., Guangdong (CN)

(72) Inventors: Meilu Lin, Shenzhen (CN); Xun Zhou, Shenzhen (CN); Xiao Han, Shenzhen (CN); Yuchen Guo, Shenzhen (CN); Yunbo Li, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 16/206,444

(22) Filed: Nov. 30, 2018

(65) Prior Publication Data

US 2019/0098679 A1    Mar. 28, 2019

Related U.S. Application Data

(63) Continuation of application No. PCT/CN2017/080031, filed on Apr. 11, 2017.

(30) Foreign Application Priority Data

Jun. 8, 2016    (CN) .......................... 201610403982.8

(51) Int. Cl.
*H04W 76/12*    (2018.01)
*H04W 72/0446*    (2023.01)
(Continued)

(52) U.S. Cl.
CPC ....... *H04W 76/12* (2018.02); *H04W 72/0446* (2013.01); *H04W 76/10* (2018.02);
(Continued)

(58) Field of Classification Search
CPC ..... H04W 76/12; H04W 76/14; H04W 76/11; H04W 76/10; H04W 72/0446;
(Continued)

(56) References Cited

U.S. PATENT DOCUMENTS

| 2009/0080388 A1* | 3/2009 | Rohfleisch | ............ H04W 72/04 |
| | | | 370/338 |
| 2010/0169498 A1* | 7/2010 | Palanki | ................. H04W 24/02 |
| | | | 709/228 |

(Continued)

FOREIGN PATENT DOCUMENTS

| CN | 104272807 A | 1/2015 |
| CN | 104662987 A | 5/2015 |

(Continued)

OTHER PUBLICATIONS

Stacey et al., "Proposed TGax draft specification", IEEE 802.11-16/0024r1, Mar. 2016, 159 pages.

(Continued)

*Primary Examiner* — Ian N Moore
*Assistant Examiner* — Latresa A McCallum
(74) *Attorney, Agent, or Firm* — Fish & Richardson P.C.

(57) ABSTRACT

Embodiments of this application describe a communication method, a first station (STA), a second STA, and an access point (AP). The method includes: determining, by a first STA, a first basic service set (BSS) color; generating, by the first STA, a data frame when the first station STA and a second STA perform D2D transmission, where the data frame includes the first BSS color; and sending, by the first STA, the data frame to the second STA. The first BSS color is carried in the D2D data frame, so that when receiving the data frame, another receiving station in a BSS to which the first STA and the second STA belong can determine that the frame is a frame from a neighboring cell.

26 Claims, 5 Drawing Sheets

(51) Int. Cl.
*H04W 76/10* (2018.01)
*H04W 76/11* (2018.01)
*H04W 76/14* (2018.01)
*H04W 80/02* (2009.01)

(52) U.S. Cl.
CPC ............ *H04W 76/11* (2018.02); *H04W 76/14* (2018.02); *H04W 80/02* (2013.01)

(58) Field of Classification Search
CPC ..... H04W 80/02; H04W 12/02; H04W 84/18; H04W 8/26; H04W 16/28; H04L 29/0651; H04L 29/12009
See application file for complete search history.

(56) References Cited

U.S. PATENT DOCUMENTS

| | | | |
|---|---|---|---|
| 2011/0228755 A1* | 9/2011 | Seok | H04W 76/14 370/338 |
| 2012/0033652 A1* | 2/2012 | Ho | H04W 88/06 713/168 |
| 2013/0231151 A1 | 9/2013 | Kneckt et al. | |
| 2014/0086200 A1 | 3/2014 | Seok | |
| 2015/0061472 A1 | 3/2015 | Leng | |
| 2015/0110093 A1 | 4/2015 | Asterjadhi et al. | |
| 2015/0373758 A1* | 12/2015 | Kim | H04W 72/23 370/329 |
| 2016/0006311 A1 | 1/2016 | Li | |
| 2016/0014725 A1* | 1/2016 | Yu | H04W 72/0453 370/329 |
| 2016/0242070 A1* | 8/2016 | Asterjadhi | H04L 1/1671 |
| 2016/0242210 A1 | 8/2016 | Seok et al. | |
| 2016/0249397 A1* | 8/2016 | Seok | H04W 74/0808 |
| 2016/0353414 A1* | 12/2016 | Choi | H04L 5/0053 |
| 2016/0366637 A1* | 12/2016 | Barriac | H04W 76/10 |
| 2017/0085461 A1* | 3/2017 | Zhou | H04L 5/0007 |
| 2017/0302343 A1 | 10/2017 | Choi et al. | |
| 2018/0184285 A1* | 6/2018 | Patil | H04L 61/5038 |
| 2019/0098679 A1* | 3/2019 | Lin | H04W 76/14 |

FOREIGN PATENT DOCUMENTS

| | | |
|---|---|---|
| CN | 105357719 A | 2/2016 |
| WO | 2015050311 A1 | 4/2015 |
| WO | 2015061472 A1 | 4/2015 |
| WO | 2016006311 A1 | 1/2016 |
| WO | 2016036016 A1 | 3/2016 |

OTHER PUBLICATIONS

Office Action issued in Japanese Application No. 2018-562,337 dated Oct. 29, 2019, 6 pages (With English Translation).
International Search Report and Written Opinion issued in International Application No. PCT/CN2017/080031 dated Jun. 30, 2017, 17 pages.
Office Action issued in Japanese Application No. 2018-562337 dated Jul. 21, 2020, 3 pages (with English translation).
Office Action issued in Chinese Application No. 201610403982.8 dated Jun. 1, 2020, 12 pages (with English translation).

* cited by examiner

FIG. 8

COMMUNICATION METHOD, FIRST STATION, SECOND STATION, AND ACCESS POINT

CROSS-REFERENCE TO RELATED APPLICATIONS

This application is a continuation of International Application No. PCT/CN2017/080031, filed on Apr. 11, 2017, which claims priority to Chinese Patent Application No. 201610403982.8, filed on Jun. 8, 2016. The disclosures of the aforementioned applications are hereby incorporated by reference in their entireties.

TECHNICAL FIELD

This application relates to the communications field, and in particular, to a communication method, a first station, a second station, and an access point.

BACKGROUND

A basic service set (BSS) color field carries a BSS color. The BSS color is an identifier of a BSS, and is used to assist a station (STA) in identifying a source of a received high efficiency physical layer convergence procedure protocol data unit HE PPDU), that is, whether the HE PPDU is from the local BSS or from an overlapping basic service set (OBSS), that is, a neighboring BSS.

Tunneled Direct Link Setup (TDLS) is a device-to-device (D2D) communication manner. With the assistance of an associated access point (AP), two stations within a same BSS can set up a TDLS direct link. After the TDLS direct link is successfully set up, the two stations can send data directly to each other without using the AP, until the TDLS direct link is disconnected.

According to a difference of a capability of an AP associated with a TDLS station, that is, a station that sets up a TDLS direct link, two specific scenarios may exist. In one scenario, the TDLS station is associated with a non-high efficiency (non-HE) AP. In another scenario, the TDLS station is associated with an HE AP. In the non-HE AP scenario, the non-HE AP cannot set a BSS color, and therefore, when using an HE PPDU to perform TDLS communication, the TDLS station cannot set a BSS color field included in the HE PPDU. In the HE AP scenario, the HE AP can set a BSS color of a local cell, and the BSS color is used for uplink or downlink communication between an HE STA and the HE AP. However, in the prior art, no specific description is made on a BSS color used by the TDLS station when performing TDLS data exchange by using the HE PPDU.

SUMMARY

Embodiments of this application provide a communication method, a first station, a second station, and an access point, so as to resolve a problem that in a non-HE AP scenario, a non-HE AP cannot set a BSS color of an HE STA. In addition, in an HE AP scenario, spatial multiplexing can be enhanced, and system efficiency and a throughput can be improved.

According to a first aspect, a communication method is provided, including: determining, by a first station STA, a first basic service set BSS color; generating, by the first STA, a data frame when the first STA and a second STA perform device-to-device D2D transmission, where the data frame includes the first BSS color; and sending, by the first STA, the data frame to the second STA.

According to the communication method in the embodiments of this application, the first BSS color is carried in the D2D data frame, so that when receiving the data frame, another receiving station in a BSS to which the first STA and the second STA belong can determine that the frame is a frame from a neighboring cell. In this way, on one hand, a problem is resolved that in a non-HE AP scenario, a non-HE AP cannot set a BSS color of an HE STA. On the other hand, in an HE AP scenario, spatial multiplexing can be enhanced, and system efficiency and a throughput can be improved.

In a possible implementation, the data frame is a high efficiency physical layer convergence procedure protocol data unit HE PPDU, and the first BSS color is carried in a basic service set BSS color field of the HE PPDU.

In a possible implementation, the determining, by a first station STA, a first basic service set BSS color includes: determining, by the first STA, the first BSS color according to a BSS parameter of a BSS to which the first STA and the second STA belong, and a STA parameter of the first STA or a STA parameter of the second STA, where the BSS parameter includes a basic service set identifier BSSID of the BSS or a second BSS color, and the STA parameter includes a MAC address of the STA or an association identifier AID of the STA, where the second BSS color is a BSS color set by an access point AP associated with the STA and the second STA.

In a possible implementation, the determining, by a first station STA, a first basic service set BSS color includes: determining, by the first STA, the last six bits of the BSSID as the first BSS color.

In a possible implementation, before the generating, by the first STA, a data frame, the method further includes: sending, by the first STA, a Tunneled Direct Link Setup TDLS setup request frame to the second STA by using the access point AP associated with the first STA and the second STA, where the TDLS setup request frame includes the first BSS color, so that the second STA determines the first BSS color as a BSS color for performing the D2D transmission with the first STA.

In a possible implementation, the method further includes: receiving, by the first STA by using the AP, a TDLS setup response frame sent by the second STA, where the TDLS setup response frame includes an acknowledgment message used to acknowledge the first BSS color.

In a possible implementation, the determining, by a first station STA, a first basic service set BSS color includes: determining, by the first STA, a preset fixed value as the first BSS color.

In a possible implementation, the preset fixed value is 0, 1, or 63.

According to a second aspect, a communication method is provided, including: receiving, by a second station STA, a Tunneled Direct Link Setup TDLS setup request frame sent by a first STA, where the TDLS setup request frame includes a first basic service set BSS color; and determining, by the second STA, the first BSS color as a BSS color for performing D2D transmission with the first STA.

In a possible implementation, the method further includes: sending, by the second STA, a TDLS setup response frame to the first STA by using an access point AP associated with the first STA and the second STA, where the TDLS setup response frame includes an acknowledgment message used to acknowledge the first BSS color.

According to a third aspect, a communication method is provided, including: receiving, by an access point AP, a Tunneled Direct Link Setup TDLS setup request frame sent by a first station STA, where the TDLS setup request frame includes a first basic service set BSS color; and sending, by the AP, the TDLS setup request frame to a second STA, so that the second STA determines the first BSS color as a BSS color for performing D2D transmission with the first STA.

In a possible implementation, the method further includes: receiving, by the AP, a TDLS setup response frame sent by the second STA, where the TDLS setup response frame includes an acknowledgment message used to acknowledge the first BSS color; and sending, by the AP, the TDLS setup response frame to the first STA.

According to a fourth aspect, a first STA is provided, configured to execute the method in the first aspect or any possible implementation of the first aspect. Specifically, the first STA includes a unit configured to execute the method in the first aspect or any possible implementation of the first aspect.

According to a fifth aspect, a second STA is provided, configured to execute the method in the second aspect or any possible implementation of the second aspect. Specifically, the second STA includes a unit configured to execute the method in the second aspect or any possible implementation of the second aspect.

According to a sixth aspect, an access point AP is provided, configured to execute the method in the third aspect or any possible implementation of the third aspect. Specifically, the access point AP includes a unit configured to execute the method in the third aspect or any possible implementation of the third aspect.

According to a seventh aspect, a first STA is provided, and the first STA includes a receiver, a transmitter, a processor, a memory, and a bus system. The receiver, the transmitter, the processor, and the memory are connected by using the bus system. The memory is configured to store an instruction. The processor is configured to execute the instruction stored by the memory, so as to control the receiver to receive a signal and control the transmitter to send the signal. When the processor executes the instruction stored by the memory, the processor executes the method in the first aspect or any possible implementation of the first aspect.

According to an eighth aspect, this application provides a second STA, and the second STA includes a receiver, a transmitter, a processor, a memory, and a bus system. The receiver, the transmitter, the processor, and the memory are connected by using the bus system. The memory is configured to store an instruction. The processor is configured to execute the instruction stored by the memory, so as to control the receiver to receive a signal and control the transmitter to send the signal. When the processor executes the instruction stored by the memory, the processor executes the method in the second aspect or any possible implementation of the second aspect.

According to a ninth aspect, this application provides an access point AP, and the access point AP includes a receiver, a transmitter, a processor, a memory, and a bus system. The receiver, the transmitter, the processor, and the memory are connected by using the bus system. The memory is configured to store an instruction. The processor is configured to execute the instruction stored by the memory, so as to control the receiver to receive a signal and control the transmitter to send the signal. When the processor executes the instruction stored by the memory, the processor executes the method in the third aspect or any possible implementation of the third aspect.

According to a tenth aspect, this application provides a computer readable medium configured to store a computer program, and the computer program includes an instruction used to execute the method in the first aspect or any possible implementation of the first aspect.

According to an eleventh aspect, this application provides a computer readable medium configured to store a computer program, and the computer program includes an instruction used to execute the method in the second aspect or any possible implementation of the second aspect.

According to a twelfth aspect, this application provides a computer readable medium configured to store a computer program, and the computer program includes an instruction used to execute the method in the third aspect or any possible implementation of the third aspect.

DESCRIPTION OF EMBODIMENTS

The following describes the technical solutions in this application with reference to the accompanying drawings.

Embodiments of this application may be applied to a wireless local area network (wireless local area network, WLAN). Currently, a standard used by the WLAN is an IEEE802.11 series. The WLAN may include multiple BSSs, and a network node in the BSS is a STA. The STA includes an access point station AP and a non-access point station (non-AP STA). Each BSS may include one AP and multiple non-AP STAs associated with the AP.

The AP may also be referred to as a wireless access point, a hotspot, or the like. The AP is an access point by using which a mobile user enters a wired network, and the AP is mainly deployed in home or within a building and a park with a typical coverage radius of tens to hundreds of meters, but certainly may also be deployed outdoors. The AP is equivalent to a bridge connecting the wired network and a wireless network. A main function of the AP is to connect wireless network clients, and then connect the wireless network and an Ethernet network. Specifically, the AP may be a terminal device or a network device with a Wireless Fidelity (WiFi) chip. Optionally, the AP may be a device that supports an 802.11ax standard. Further, optionally, the AP may be a device that supports multiple WLAN standards, such as 802.11ac, 802.11n, 802.11g, 802.11b, and 802.11a.

The non-AP STA may be a wireless communications chip, a wireless sensor, or a wireless communications terminal, for example, a mobile phone that supports a WiFi communication function, a tablet computer that supports a WiFi communication function, a set top box that supports a WiFi communication function, a smart TV that supports a WiFi communication function, an intelligent wearable device that supports a WiFi communication function, a vehicular communications device that supports a WiFi communication function, and a computer that supports a WiFi communication function. Optionally, the station may support the 802.11ax standard. Further, optionally, the station supports multiple WLAN standards, such as 802.11ac, 802.11n, 802.11g, 802.11b, and 802.11a.

Figure 1:
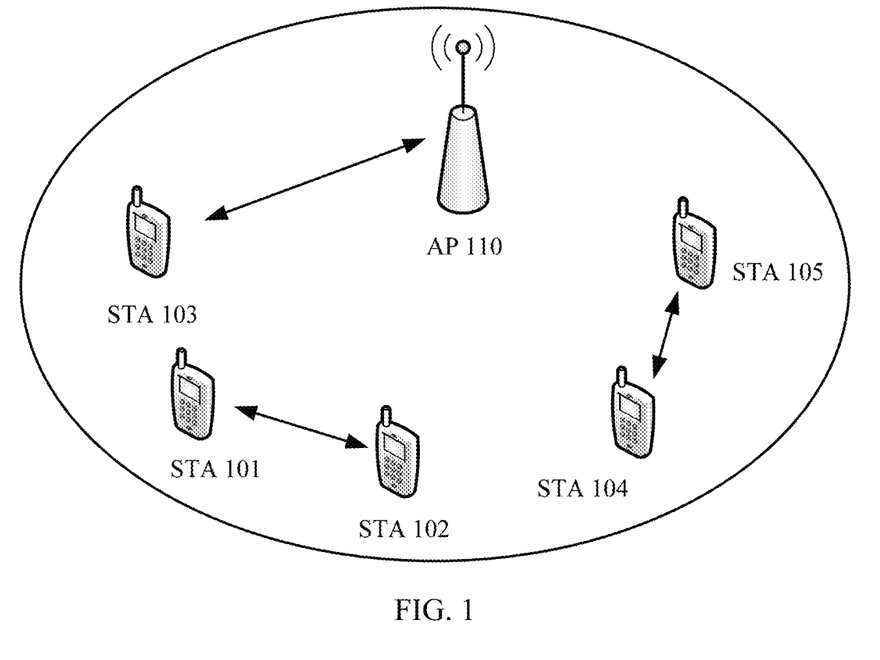
FIG. 1 is a schematic diagram of an application scenario according to an embodiment of this application.

FIG. 1 is a schematic diagram of an application scenario according to an embodiment of this application. In FIG. 1, a STA 101, a STA 102, a STA 103, a STA 104, and a STA 105 are all associated with an AP 110. The STA may be an HE STA, and the AP may be an HE AP or a non-HE AP. In a BSS set up by the AP 110, a normal link (the AP to the STA, or the STA to the AP) and a direct link (the STA to the STA, that is, D2D) coexist. Communication between the STA 101 and the STA 102 belongs to D2D (for example, TDLS) communication, communication between the STA 104 and the STA 105 belongs to the D2D communication as well, and communication between the STA 103 and the AP 110 belongs to normal link communication.

When the AP 110 is in a non-HE AP scenario, the non-HE AP cannot set a BSS color, and therefore, when using an HE PPDU to perform TDLS communication, a TDLS station cannot set a BSS color field included in the HE PPDU.

When the AP 110 is in an HE AP scenario, the HE AP can set a BSS color of the local BSS, and the BSS color is used for uplink or downlink communication between the HE STA and the HE AP. However, in the prior art, no specific description is made on a BSS color of the HE PPDU in TDLS station data exchange.

In a communication method provided in an embodiment of this application, when two stations perform transmission in a D2D manner, a dedicated BSS color may be used. In this embodiment of this application, the dedicated BSS color may be referred to as a "first BSS color". In this way, on one hand, a problem is resolved that in the non-HE AP scenario, the non-HE AP cannot set a BSS color of an HE STA. On the other hand, a problem of setting the BSS color for performing D2D transmission is resolved in the HE AP scenario. The following specifically describes the communication method according to the embodiment of this application.

It should be understood that a first STA and a second STA in an embodiment of this application may be any two stations of D2D communication, and are two equivalent STAs. That is, the second STA may also serve as a sender, and the first STA may also serve as a receiver. This is not limited in this embodiment of this application. For example, the first STA may be the STA 101 shown in FIG. 1, and the second STA may be the STA 102. The first STA may also be the STA 104, and the second STA may be the STA 105.

Figure 2:
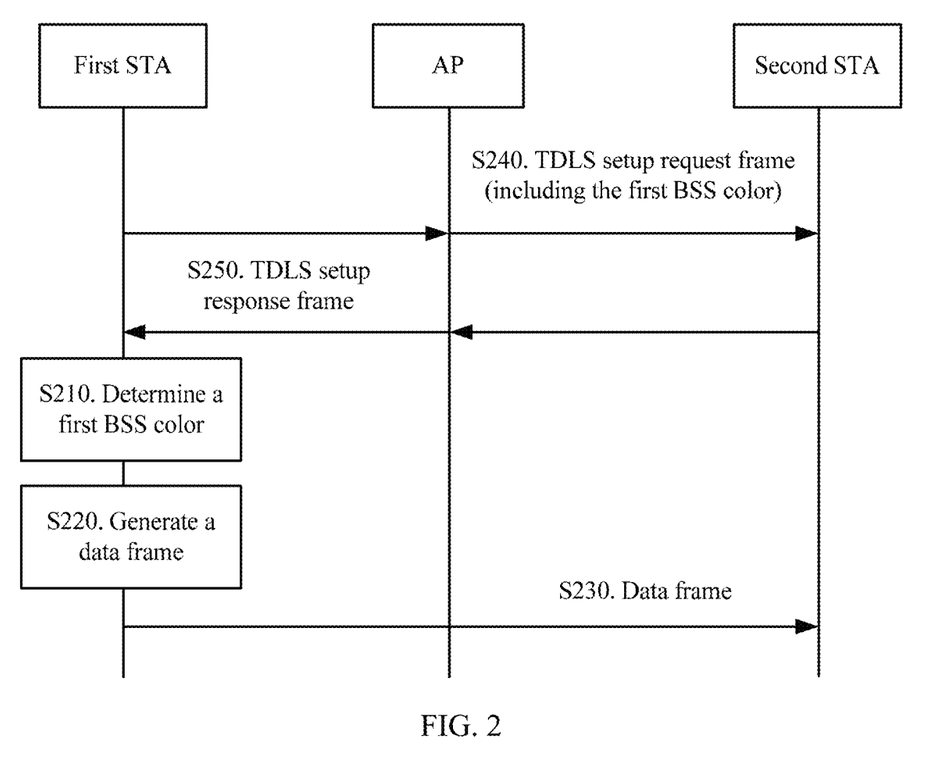
FIG. 2 is a schematic flowchart of a communication method according to an embodiment of this application.

FIG. 2 is a schematic flowchart of a communication method according to an embodiment of this application.

S210. A first station STA determines a first basic service set BSS color.

S220. The first STA generates a data frame when the first STA and a second STA perform device-to-device D2D transmission, where the data frame includes the first BSS color.

S230. The first STA sends the data frame to the second STA.

In the prior art, if the first STA and the second STA are associated with an HE AP, when performing uplink or downlink communication with the HE AP, the first STA or the second STA may use a BSS color set by the HE AP, which is referred to as a second BSS color. However, no specific description is made on a BSS color used when the D2D transmission is performed. In this embodiment of this application, when the first STA and the second STA perform the D2D transmission, the first BSS color that is set independent from an AP and that may be autonomously determined by the first STA or the second STA is used. If a STA in a BSS in which the first STA and the second STA are located is associated with a non-HE AP, the first STA and the second STA have no BSS color when performing the D2D transmission. However, the first STA and the second STA in this embodiment of this application may set a similar BSS color, that is, the first BSS color.

Specifically, two stations of the D2D transmission, that is, the first STA and the second STA, may first determine the first BSS color before performing the D2D transmission. Generally, two first BSS colors determined by the first STA and the second STA are the same. When performing D2D data exchange, the first STA generates the data frame according to the previously determined first BSS color, that is, the data frame includes the first BSS color. Then, the first STA sends the data frame to the second STA. After receiving the data frame, the second STA compares the first BSS color in the data frame with a BSS color stored by the second STA. Because the first BSS color is stored in the second STA, the data frame may be determined to be from a D2D transmission station. Certainly, the data frame is surely from the local BSS, that is, the BSS in which the first STA and the second STA are located.

It can be understood that in an HE AP scenario, the first BSS color that is autonomously set by the STA independent from the AP is surely different from a BSS color allocated by the AP, that is, the second BSS color, because autonomous setting is not necessary if the first BSS color and the second BSS color are the same.

In this embodiment of this application, a station that does not set up D2D transmission in the BSS to which the first STA and the second STA belong may also receive the data frame. In this case, the STA 103 shown in FIG. 1 is used as an example for description, and there are two cases.

Case 1:

The station in the BSS is associated with the non-HE AP. In this case, the non-HE AP does not have a capability of setting a BSS color, and therefore, the STA 103 does not have a BSS color. When receiving the data frame, the STA 103 finds that the data frame carries the first BSS color, and therefore believes that the data frame is from a neighboring BSS.

Case 2:

The station in the BSS is associated with the HE AP. In this case, the STA 103 stores the BSS color set by the HE AP, that is, the second BSS color. When receiving the data frame, the STA 103 reads the first BSS color in the data frame. The first BSS color is different from the BSS color stored by the STA 103, and therefore, the STA 103 believes that the data frame is from a neighboring BSS.

In the foregoing two cases, when the STA 103 performs clear channel assessment (CCA), a CCA threshold is an overlapping basic service set packet detection threshold, and the overlapping basic service set packet detection threshold is greater than a minimum receiving threshold (for example, −62 dBm) of a receiver. The STA 103 determines whether a channel is busy or idle according to a detected value relationship between signal energy of the data frame and the overlapping basic service set packet detection threshold. Specifically, when detecting that the signal energy of the data frame is greater than the overlapping basic service set packet detection threshold, the STA 103 determines that the channel is busy, and may discard the packet. When detecting that the signal energy of the data frame is less than the overlapping basic service set packet detection threshold, the STA 103 determines that the channel is idle, and then continues to determine another condition required by spatial multiplexing. If the another condition is satisfied as well, the STA 103 may perform the spatial multiplexing. By means of the spatial multiplexing, in the BSS to which the first STA and the second STA belong, two STAs, that is, the STA 103 and a neighboring cell STA that is performing transmission, are allowed to simultaneously perform sending by using a same channel, and therefore, system efficiency and a throughput can be improved.

In the prior art, in the HE AP scenario, it is believed that the first STA and the second STA may use the BSS color set by the AP, when performing the D2D transmission. In this way, when the STA 103 receives the data frame, a BSS identifier in the data frame is the same as the BSS color stored by the STA 103, and therefore, the data frame is believed to be from the local BSS. In this case, the STA 103 does not perform the spatial multiplexing. The STA 103 only performs conventional CCA detection, and determines whether the channel is busy or idle by using a CCA threshold that is less than the overlapping basic service set packet detection threshold (for example, −82 dBm). If the channel is idle, the STA 103 can perform normal WiFi sending. For a data frame from the neighboring BSS, the STA 103 performs CCA detection by using the basic service set packet detection threshold.

For example, in the prior art, the first BSS color in the data frame sent by the first STA and the BSS color stored by the STA 103 are both set by the AP, and therefore, the first BSS color in the data frame is the same as the BSS color stored by the STA 103, and the STA 103 determines that the data frame sent by the first STA is from the local BSS. The STA 103 may use a CCA threshold of a value −82 dBm to determine whether the channel is busy or idle. If the signal energy of the data frame is detected to be −72 dBm, because −72 dBm is greater than −82 dBm, the STA 103 believes that the channel is busy. In this embodiment of this application, the first BSS color in the data frame is different from the BSS color stored by the STA 103, and therefore, the STA 103 believes that the foregoing data frame is from a neighboring cell, and may use a CCA threshold of a value −62 dBm to determine whether the channel is busy or idle. When the signal energy of the data frame is detected to be −72 dBm, because −72 dBm is less than −62 dBm, the STA 103 believes that the channel is idle. In this case, the STA 103 has an opportunity to perform the spatial multiplexing.

Therefore, according to the communication method in this embodiment of this application, the first BSS color is carried in the D2D data frame, so that when receiving the data frame, another receiving station in the BSS to which the first STA and the second STA belong can determine that the frame is a frame from a neighboring cell. In this way, on one hand, a problem is resolved that in a non-HE AP scenario, a non-HE AP cannot set a BSS color of an HE STA. On the other hand, in the HE AP scenario, the spatial multiplexing can be enhanced, and the system efficiency and the throughput can be improved.

Optionally, the data frame is a high efficiency physical layer convergence procedure protocol data unit HE PPDU, and the first BSS color is carried in a basic service set BSS color field of the HE PPDU.

The data frame in this embodiment of this application may use an existing HE PPDU frame format. A high efficiency signal field (high efficiency signal field, HE-SIG) in the HE PPDU includes the BSS color field (six bits defined in a current standard, that is, an available BSS color value is an integer value from 0 to 63). In the non-HE AP scenario, the non-HE AP does not have a capability of setting a BSS color, and therefore, the BSS color field is usually empty. In the HE AP scenario, a value filled in the BSS color field is used to indicate a source of the data frame. In this embodiment of this application, when the HE PPDU frame format is used, the first BSS color may be carried in the BSS color field, and the first BSS color is used to indicate the D2D transmission between the first STA and the second STA.

More specifically, when the first STA and the second STA perform the D2D transmission, in the non-HE AP scenario, the first STA may directly add the first BSS color into the BSS color field of the data frame. In the HE AP scenario, the first STA may no longer use the second BSS color, and equivalently, the first BSS color is used to replace the second BSS color.

In addition, in this embodiment of this application, a new field may further be added into the data frame format in the prior art to carry the first BSS color.

It should be understood that the D2D transmission in this embodiment of this application may use the TDLS protocol.

It should be noted that in this embodiment of this application, a first BSS color of each pair of STAs of D2D transmission may be the same, or may be different.

If the first BSS color of each pair of STAs of D2D transmission is the same, when a STA that sets up a D2D connection receives a data frame of another pair of D2D stations, because a first BSS color of the another pair of D2D stations is the same as a first BSS color of the STA, the data frame is believed to be from the local BSS, that is, the BSS to which the first STA and the second STA belong. Therefore, the spatial multiplexing is not performed.

If the first BSS color of each pair of STAs of D2D transmission is different, when a pair of STAs (for example, a STA 104) of D2D transmission receives a data frame sent by another pair of STAs (for example, a STA 101) of D2D transmission, the data frame is determined to be from a neighboring BSS. Therefore, if the channel is detected to be idle, the STA 104 has the opportunity to perform the spatial multiplexing, so that the system efficiency can be further improved.

Optionally, before the first STA generates the data frame, the method may further include: S240. The first STA sends a Tunneled Direct Link Setup TDLS setup request frame to the second STA by using an access point AP associated with the first STA and the second STA, where the TDLS setup request frame includes the first BSS color, so that the second STA determines the first BSS color as a BSS color for performing the D2D transmission with the first STA.

Specifically, in a procedure of setting up the D2D connection between the first STA and the Second STA, the first BSS color may be set) The first STA may select a value as the first BSS color, add an information field into the TDLS setup request frame, or carry the selected first BSS color by using an idle field or by reusing an existing field, and then send the TDLS setup request frame to the AP. After receiving the TDLS setup request frame, the AP forwards the TDLS setup request frame to the second STA. In this way, when receiving the TDLS setup request frame, the second STA may correspondingly store the first BSS color, and use the first BSS color sent by the first STA as a first BSS color for performing data exchange with the first STA.

Optionally, the method may further include: 250. The first STA receives, by using the AP, a TDLS setup response frame sent by the second STA, where the TDLS setup response frame includes an acknowledgment message used to acknowledge the first BSS color.

After the second STA receives the TDLS setup request frame, the second STA may add an information field into the TDLS setup response frame that is sent to the first STA, or carry the acknowledgment message by using an idle field or by reusing an existing field, so as to determine the first BSS color. After receiving the TDLS setup response frame forwarded by the AP, by reading the acknowledgment message, the first STA may determine to use the first BSS color to perform the D2D transmission.

According to the communication method in this embodiment of this application, when the D2D stations negotiate to set the first BSS color, each pair of D2D stations may use a different first BSS color, that is, each pair of D2D stations may separately become one virtual cell. In this way, during communication of a pair of D2D stations, all other STAs other than the pair of D2D stations may have the opportunity to perform the spatial multiplexing, so that the system efficiency can be improved.

Optionally, when determining the first BSS color, the first STA may determine a preset fixed value as the first BSS color. In this case, first BSS colors of all STAs that set up a D2D connection in the local BSS are the same.

For example, the preset fixed value may be 0, or the preset fixed value may be 1, or may be 63, which is not limited in this embodiment of this application.

When performing the D2D transmission, the first STA and the second STA may use a preset fixed value as the first BSS color to send and receive data. Specifically, after the first STA and the second STA set up the D2D connection by using the associated AP, the first STA copies the preset fixed value to the data frame (for example, the BSS color field of the HE PPDU), and then sends the data frame to the second STA to perform the data exchange with the second STA. When receiving the data frame sent by the first STA, a STA (a STA of the local BSS or the neighboring BSS) may use the preset fixed value to determine whether the data frame is from the local BSS or the neighboring BSS.

In the HE AP scenario, for a STA that does not set up a D2D connection in the local BSS, similarly, the STA 103 is used as an example for description, and when receiving the data frame, the STA 103 may determine that the BSS color in the BSS color field stored by the STA 103 is different from the preset fixed value. In this case, the STA 103 believes that the data frame is from a neighboring cell. After the CCA is performed and the channel is determined to be idle, the STA 103 may continue to determine the another condition required by the spatial multiplexing. If the another condition is satisfied as well, the STA 103 may perform the spatial multiplexing. In addition, in this scenario, when communicating with the AP, the STA still uses the BSS color set by the AP. It should be noted that at least one first BSS color and one BSS color are stored in the first STA and the second STA, and are respectively used for the D2D transmission and the communication with the AP. When a station that sets up a D2D connection receives a transmission frame, if a first BSS color or a BSS color included in the transmission frame is equal to a first BSS color or a second BSS color stored by the station, the D2D station believes that a frame of a local BSS is received. In this case, the station that sets up the D2D connection does not perform the spatial multiplexing.

It should be understood that the second STA may store multiple BSS colors, for example, may simultaneously store the second BSS color for communicating with the AP and the first BSS color for communicating with the first STA. Alternatively, if the second STA further sets up a D2D connection with a third STA (one STA in the local BSS), the second STA may further store a BSS color for performing D2D transmission with the third STA.

Optionally, when determining the first BSS color, the first STA may determine the first BSS color according to a BSS parameter. In this case, first BSS colors of all STAs that set up a D2D connection in the local BSS are the same.

For example, the first BSS color may be determined according to a basic service set identifier (basic service set identifier, BSSID) of the local BSS. Specifically, the last several bits of the BSSID may be used as the first BSS color. For another example, the first BSS color may be determined according to the second BSS color. More specifically, a value of the second BSS color+1 may be used as the first BSS color.

In this embodiment of this application, in a scenario in which the first STA and the second STA are associated with the HE AP, the AP may obtain the first BSS color, and store the first BSS color. The AP receives a transmission frame (for example, the data frame sent by the first STA) that includes the first BSS color, reads the first BSS color in the transmission frame, and may determine that the transmission frame is from the local BSS by comparing the first BSS color stored by the AP and the first BSS color in the transmission frame. Therefore, the AP does not perform the spatial multiplexing. By means of the foregoing method, a problem may be avoided that, if the AP is allowed to perform the spatial multiplexing, the AP sends downlink data to a station that is performing D2D transmission, causing a receiving conflict of the station of the D2D transmission.

Therefore, in this embodiment of this application, when D2D stations use a same first BSS color for D2D transmission, the D2D stations may constitute a virtual cell. In this way, when the D2D stations communicate, another station that does not set up a D2D connection may have the opportunity to perform the spatial multiplexing.

Optionally, when the first STA determines the first BSS color, the first STA may determine the first BSS color according to a parameter of the first STA or the second STA.

For example, the first BSS color may be determined according to a Media Access Control (MAC) address of the first STA or the second STA. Specifically, several bits of the MAC address may be used as the first BSS color. In addition, the first BSS color may also be determined according to an association identifier (association identifier, AID) of the first STA or the second STA. Specifically, the last several bits of the AID may be used as the first BSS color. This is not limited in this embodiment of this application.

In this embodiment of this application, in a scenario in which the first STA and the second STA are associated with the HE AP, the AP may obtain the first BSS color, and store the first BSS color. The AP receives a transmission frame (for example, the data frame sent by the first STA) that includes the first BSS color, reads the first BSS color in the transmission frame, and may determine that the transmission frame is from the local BSS by comparing the first BSS color stored by the AP and the first BSS color in the transmission frame. Therefore, the AP does not perform the spatial multiplexing. By means of the foregoing method, a problem may be avoided that, if the AP is allowed to perform the spatial multiplexing, the AP sends downlink data to a station that is performing D2D transmission, causing a receiving conflict of the station of the D2D transmission.

According to the communication method in this embodiment of this application, when the D2D stations set the first BSS color, each pair of D2D stations may use and set a different first BSS color, that is, each pair of D2D stations may separately become one virtual cell. In this way, during communication of a pair of D2D stations, all other stations other than the pair of D2D stations may have the opportunity to perform the spatial multiplexing. FIG. 1 is used as an example. When the STA 101 and the STA 102 perform D2D transmission, in this case, not only the STA 103 has the opportunity to perform the spatial multiplexing, but also the STA 104 and the STA 105 have the opportunity to perform the spatial multiplexing.

The foregoing describes the communication method according to the embodiment of this application in detail with reference to FIG. 1 and FIG. 2. The following describes a station and an access point according to embodiments of this application with reference to FIG. 3 to FIG. 5.

Figure 3:
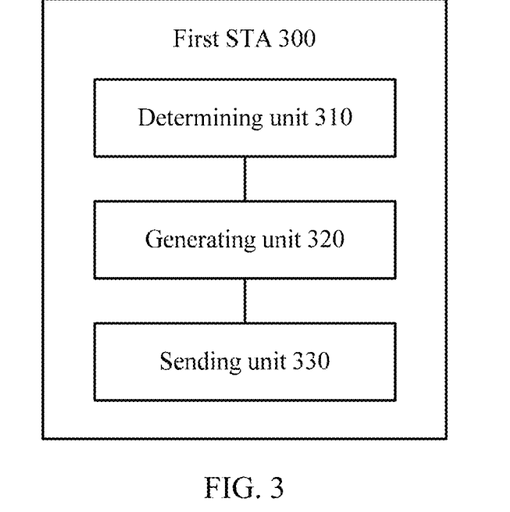
FIG. 3 is a schematic block diagram of a first STA according to an embodiment of this application.

FIG. 3 shows a schematic block diagram of a first STA 300 according to an embodiment of this application. As shown in FIG. 3, the first STA 300 includes: a determining unit 310, a generating unit 320, and a sending unit 330.

The determining unit 310 is configured to determine a first basic service set BSS color.

The generating unit 320 is configured to generate a data frame when the first STA and a second STA perform device-to-device D2D transmission, where the data frame includes the first BSS color.

The sending unit 330 is configured to send the data frame to the second STA.

The foregoing and other operations or functions of the units of the first STA 300 according to this embodiment of this application are respectively used to implement corresponding procedures executed by a first STA in the foregoing method. For brevity, details are not described herein.

Therefore, according to the communication method in this embodiment of this application, the first BSS color is carried in the D2D data frame, so that when receiving the data frame, another receiving station in a BSS to which the first STA and the second STA belong can determine that the frame is a frame from a neighboring cell. In this way, on one hand, a problem is resolved that in a non-HE AP scenario, a non-HE AP cannot set a BSS color of an HE STA. On the other hand, in an HE AP scenario, spatial multiplexing can be enhanced, and system efficiency and a throughput can be improved.

Figure 4:
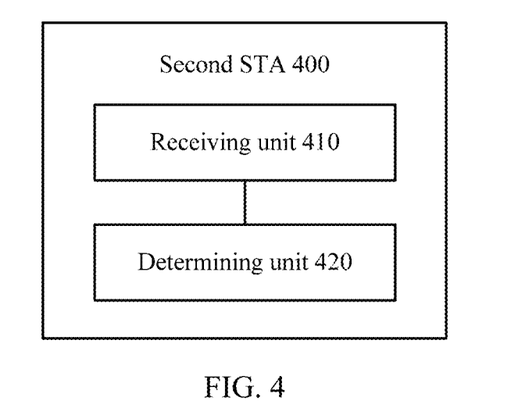
FIG. 4 is a schematic block diagram of a second STA according to an embodiment of this application.

FIG. 4 shows a schematic block diagram of a second STA 400 according to an embodiment of this application. As shown in FIG. 4, the second STA 400 includes: a receiving unit 410 and a determining unit 420.

The receiving unit 410 is configured to receive a Tunneled Direct Link Setup TDLS setup request frame sent by a first STA, where the TDLS setup request frame includes a first basic service set BSS color.

The determining unit 420 is configured to determine the first BSS color as a BSS color for performing D2D transmission with the first STA.

The foregoing and other operations or functions of the units of the second STA 400 according to this embodiment of this application are respectively used to implement corresponding procedures executed by a second STA in the foregoing method. For brevity, details are not described herein.

Figure 5:
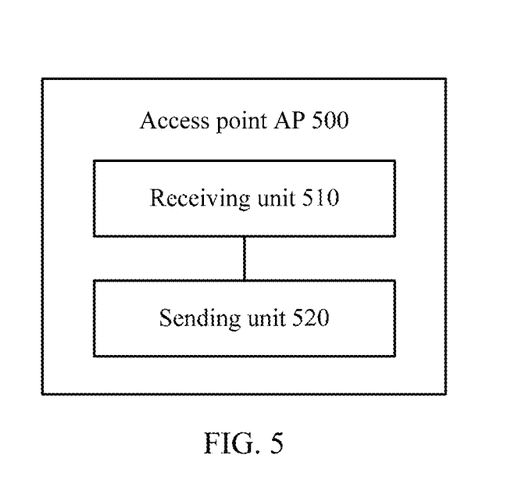
FIG. 5 is a schematic block diagram of an access point AP according to an embodiment of this application.

FIG. 5 shows a schematic block diagram of an access point AP 500 according to an embodiment of this invention. As shown in FIG. 5, the access point AP 500 includes: a receiving unit 510 and a sending unit 520.

The receiving unit 510 is configured to receive a Tunneled Direct Link Setup TDLS setup request frame sent by a first station STA, where the TDLS setup request frame includes a first basic service set BSS color.

The sending unit 520 is configured to send the TDLS setup request frame to a second STA, so that the second STA determines the first BSS color as a BSS color for performing D2D transmission with the first STA.

The foregoing and other operations or functions of the units of the access point AP 500 according to this embodiment of this application are respectively used to implement corresponding procedures executed by an AP in the foregoing method. For brevity, details are not described herein.

The foregoing describes the communication method according to the embodiment of this application in detail with reference to FIG. 1 and FIG. 2. The following describes a station and an access point according to embodiments of this application with reference to FIG. 6 to FIG. 8.

Figure 6:
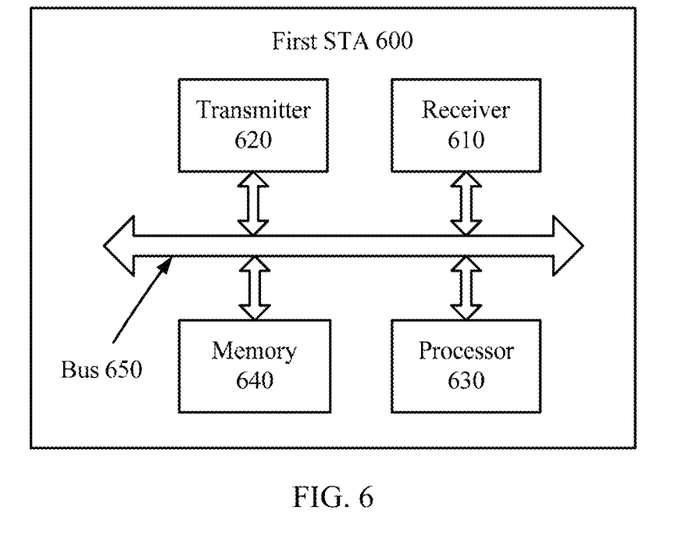
FIG. 6 is a schematic structural diagram of a first STA according to an embodiment of this application.

FIG. 6 is a schematic structural diagram of a first STA 600 according to an embodiment of this application. As shown in FIG. 6, the signal transmit end device 600 includes: a receiver 610, a transmitter 620, a processor 630, a memory 640, and a bus system 660. The receiver 610, the transmitter 620, the processor 630, and the memory 640 are connected by using the bus system 660. The memory 640 is configured to store an instruction. The processor 630 is configured to execute the instruction stored by the memory 640, so as to control the receiver 610 to receive a signal and control the transmitter 620 to send the signal.

The processor 630 is configured to determine a first basic service set BSS color.

The processor 630 is further configured to generate a data frame when the first STA and a second STA perform device-to-device D2D transmission, where the data frame includes the first BSS color.

The transmitter 620 is configured to send the data frame to the second STA.

It should be understood that in this embodiment of this application, the processor 630 may be a central processing unit (central processing unit, CPU), or the processor 630 may be another general purpose processor, a digital signal processor (DSP), an application-specific integrated circuit (ASIC), a field programmable gate array (FPGA), another programmable logic device, a discrete gate or transistor logic device, a discrete hardware component, or the like. The general purpose processor may be a microprocessor or this processor may be any normal processor, or the like.

The memory 640 may include a read-only memory and a random access memory, and provides an instruction and data for the processor 630. A part of the memory 640 may further include a nonvolatile random access memory. For example, the memory 640 may further store information about a device type.

In addition to a data bus, the bus system 660 may include a power bus, a control bus, a status signal bus, and the like. However, for clarity of description, various buses are marked as the bus system 660 in the figure.

In an implementation process, the steps in the foregoing method may be completed by means of an integrated logic circuit of hardware in the processor 630 or an instruction in a form of software. The steps of the communication method disclosed with reference to the embodiment of this application may be directly performed by a hardware processor, or may be performed by using a combination of hardware in the processor and a software module. The software module may be located in a mature storage medium in the field, such as a random access memory, a flash memory, a read-only memory, a programmable read-only memory, an electrically-erasable programmable memory, or a register. The storage medium is located in the memory 640. The processor 630 reads information in the memory 640, and completes the steps of the foregoing method in combination with hardware of the processor 630. To avoid repetition, details are not described herein repeatedly.

The foregoing and other operations or functions of the units of the first STA 600 according to this embodiment of this application are respectively used to execute corresponding procedures executed by a first STA in the foregoing method. For brevity, details are not described herein.

Therefore, according to the communication method in this embodiment of this application, the first BSS color is carried in the D2D data frame, so that when receiving the data frame, another receiving station in a BSS to which the first STA and the second STA belong can determine that the frame is a frame from a neighboring cell. In this way, on one hand, a problem is resolved that in a non-HE AP scenario, a non-HE AP cannot set a BSS color of an HE STA. On the other hand, in an HE AP scenario, spatial multiplexing can be enhanced, and system efficiency and a throughput can be improved.

Figure 7:
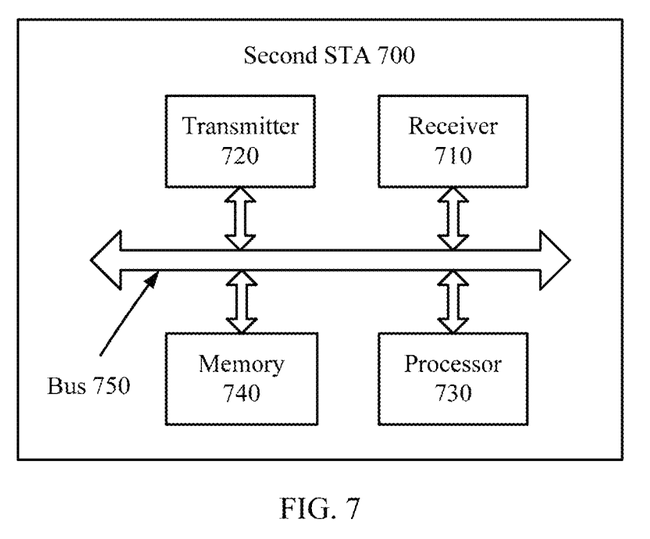
FIG. 7 is a schematic structural diagram of a second STA according to an embodiment of this application.

FIG. 7 is a schematic structural diagram of a second STA 700 according to an embodiment of this application. As shown in FIG. 7, the signal transmit end device 700 includes: a receiver 710, a transmitter 720, a processor 730, a memory 740, and a bus system 770. The receiver 710, the transmitter 720, the processor 730, and the memory 740 are connected by using the bus system 770. The memory 740 is configured to store an instruction. The processor 730 is configured to execute the instruction stored by the memory 740, so as to control the receiver 710 to receive a signal and control the transmitter 720 to send the signal.

The receiver 710 is configured to receive a Tunneled Direct Link Setup TDLS setup request frame sent by a first STA, where the TDLS setup request frame includes a first basic service set BSS color.

The transmitter 720 is configured to determine the first BSS color as a BSS color for performing D2D transmission with the first STA.

It should be understood that in this embodiment of this application, the processor 730 may be a central processing unit (central processing unit, CPU), or the processor 730 may be another general purpose processor, a digital signal processor (DSP), an application-specific integrated circuit (ASIC), a field programmable gate array (FPGA), another programmable logic device, a discrete gate or transistor logic device, a discrete hardware component, or the like. The general purpose processor may be a microprocessor or this processor may be any normal processor, or the like.

The memory 740 may include a read-only memory and a random access memory, and provides an instruction and data for the processor 730. A part of the memory 740 may further include a nonvolatile random access memory. For example, the memory 740 may further store information about a device type.

In addition to a data bus, the bus system 770 may include a power bus, a control bus, a status signal bus, and the like. However, for clarity of description, various buses are marked as the bus system 770 in the figure.

In an implementation process, the steps in the foregoing method may be completed by means of an integrated logic circuit of hardware in the processor 730 or an instruction in a form of software. The steps of the communication method disclosed with reference to the embodiment of this application may be directly performed by a hardware processor, or may be performed by using a combination of hardware in the processor and a software module. The software module may be located in a mature storage medium in the field, such as a random access memory, a flash memory, a read-only memory, a programmable read-only memory, an electrically-erasable programmable memory, or a register. The storage medium is located in the memory 740. The processor 730 reads information in the memory 740, and completes the steps of the foregoing method in combination with hardware of the processor 730. To avoid repetition, details are not described herein repeatedly.

The foregoing and other operations or functions of the units of the second STA 700 according to this embodiment of this application are respectively used to execute corresponding procedures executed by a second STA in the foregoing method. For brevity, details are not described herein.

Figure 8:
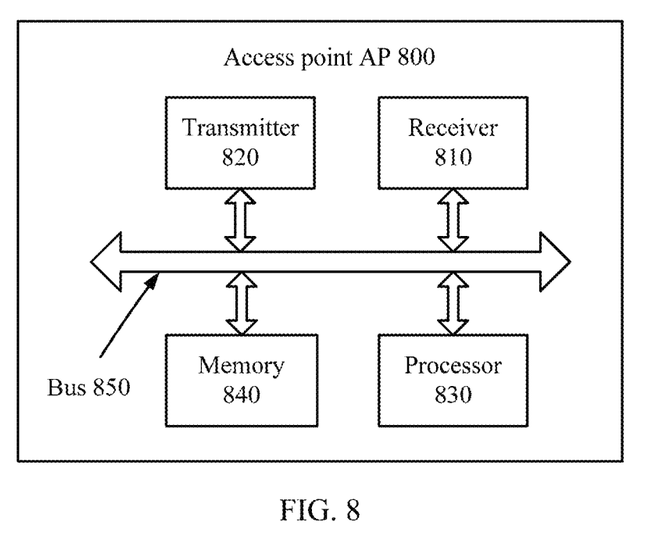
FIG. 8 is a schematic structural diagram of an access point AP according to an embodiment of this application.

FIG. 8 is a schematic structural diagram of an access point AP 800 according to an embodiment of this application. As shown in FIG. 8, the signal transmit end device 800 includes: a receiver 810, a transmitter 820, a processor 830, a memory 840, and a bus system 880. The receiver 810, the transmitter 820, the processor 830, and the memory 840 are connected by using the bus system 880. The memory 840 is configured to store an instruction. The processor 830 is configured to execute the instruction stored by the memory 840, so as to control the receiver 810 to receive a signal and control the transmitter 820 to send the signal.

The receiver 810 is configured to receive a Tunneled Direct Link Setup TDLS setup request frame sent by a first station STA, where the TDLS setup request frame includes a first basic service set BSS color.

The transmitter 820 is configured to send the TDLS setup request frame to a second STA, so that the second STA determines the first BSS color as a BSS color for performing D2D transmission with the first STA.

It should be understood that in this embodiment of this application, the processor 830 may be a central processing unit (central processing unit, CPU), or the processor 830 may be another general purpose processor, a digital signal processor (DSP), an application-specific integrated circuit (ASIC), a field programmable gate array (FPGA), another programmable logic device, a discrete gate or transistor logic device, a discrete hardware component, or the like. The general purpose processor may be a microprocessor or this processor may be any normal processor, or the like.

The memory 840 may include a read-only memory and a random access memory, and provides an instruction and data for the processor 830. A part of the memory 840 may further include a nonvolatile random access memory. For example, the memory 840 may further store information about a device type.

In addition to a data bus, the bus system 880 may include a power bus, a control bus, a status signal bus, and the like. However, for clarity of description, various buses are marked as the bus system 880 in the figure.

In an implementation process, the steps in the foregoing method may be completed by means of an integrated logic circuit of hardware in the processor 830 or an instruction in a form of software. The steps of the communication method disclosed with reference to the embodiment of this application may be directly performed by a hardware processor, or may be performed by using a combination of hardware in the processor and a software module. The software module may be located in a mature storage medium in the field, such as a random access memory, a flash memory, a read-only memory, a programmable read-only memory, an electrically-erasable programmable memory, or a register. The storage medium is located in the memory 840. The processor 830 reads information in the memory 840, and completes the steps of the foregoing method in combination with hardware of the processor 830. To avoid repetition, details are not described herein repeatedly.

The foregoing and other operations or functions of the units of the access point AP 800 according to this embodiment of this application are respectively used to execute corresponding procedures executed by an AP in the foregoing method. For brevity, details are not described herein.

Therefore, according to the communication method in this embodiment of this application, the first BSS color is carried in a D2D data frame, so that when receiving the data frame, another receiving station in a BSS to which the first STA and the second STA belong can determine that the frame is a frame from a neighboring cell. In this way, on one hand, a problem is resolved that in a non-HE AP scenario, a non-HE AP cannot set a BSS color of an HE STA. On the other hand, in an HE AP scenario, spatial multiplexing can be enhanced, and system efficiency and a throughput can be improved.

The term "and/or" in this specification describes only an association relationship for describing associated objects and represents that three relationships may exist. For example, A and/or B may represent the following three cases: Only A exists, both A and B exist, and only B exists. In addition, the character "/" in this specification generally indicates an "or" relationship between the associated objects.

It should be understood that sequence numbers of the foregoing processes do not mean execution sequences in various embodiments of this application. The execution sequences of the processes should be determined according to functions and internal logic of the processes, and should not be construed as any limitation on the implementation processes of the embodiments of this application.

A person of ordinary skill in the art may be aware that, the units and algorithm steps in the examples described with reference to the embodiments disclosed in this specification may be implemented by electronic hardware or a combination of computer software and electronic hardware. Whether the functions are performed by hardware or software depends on particular applications and design constraint conditions of the technical solutions. A person skilled in the art may use different methods to implement the described functions for each particular application, but it should not be considered that the implementation goes beyond the scope of this application.

It may be clearly understood by a person skilled in the art that, for the purpose of convenient and brief description, for a detailed working process of the foregoing system, apparatus, and unit, reference may be made to a corresponding process in the foregoing method embodiments, and details are not described.

In the several embodiments provided in this application, it should be understood that the disclosed system, apparatus, and method may be implemented in other manners. For example, the described apparatus embodiment is merely an example. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented through some interfaces, indirect couplings or communication connections between the apparatuses or units, or electrical connections, mechanical connections, or connections in other forms.

The units described as separate parts may or may not be physically separate, and parts displayed as units may or may not be physical units, may be located in one position, or may be distributed on a plurality of network units. Some or all of the units may be selected according to actual needs to achieve the objectives of the solutions of the embodiments.

In addition, functional units in the embodiments of this application may be integrated into one processing unit, or each of the units may exist alone physically, or two or more units are integrated into one unit.

When the functions are implemented in the form of a software functional unit and sold or used as an independent product, the functions may be stored in a computer-readable storage medium. Based on such an understanding, the technical solutions of this application essentially, or the part contributing to the prior art, or some of the technical solutions may be implemented in a form of a software product. The software product is stored in a storage medium, and includes several instructions for instructing a computer device (which may be a personal computer, a server, or a network device) to perform all or some of the steps of the methods described in the embodiments of the present invention. The foregoing storage medium includes: any medium that can store program code, such as a USB flash drive, a removable hard disk, a read-only memory (Read-Only Memory, ROM), a random access memory (Random Access Memory, RAM), a magnetic disk, or an optical disc.

The foregoing descriptions are merely specific implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. A communication method, comprising:
    setting, by a first station (STA), a basic service set (BSS) color to be used by a second STA in a device-to-device (D2D) transmission with the first STA, wherein the first STA sets the BSS color to be a first color that is preconfigured for D2D transmission, wherein the first color is different from a second color allocated by an access point (AP) associated with the first STA for transmission with the AP, and wherein the first color is used for D2D transmissions between the first STA and other STAs in addition to the first color being used for D2D transmission between the first STA and the second STA; and;
    generating, by the first STA, a data frame that comprises the BSS color that is the first color; and
    sending, by the first STA, the data frame to the second STA in the D2D transmission.

2. The method according to claim 1, wherein the data frame is a high efficiency physical layer convergence procedure protocol data unit (HE PPDU), and the BSS color is carried in a BSS color field of the HE PPDU.

3. The method according to claim 1, wherein before the generating the data frame, the method further comprises:
    sending, by the first STA, by using the AP, a first frame to the second STA.

4. The method according to claim 3, wherein the method further comprises:
    receiving, by the first STA by using the AP, a TDLS setup response frame sent by the second STA, wherein the TDLS setup response frame comprises an acknowledgment message that acknowledges the BSS color.

5. The method according to claim 1, wherein the BSS color is used for an access point (AP) to determine whether spatial multiplexing can be performed, when a transmission frame including the BSS color is received.

6. The method according to claim 1, wherein the BSS color of each pair of STAs of D2D transmission is same.

7. A communication method, comprising:
receiving, by a second station (STA), a basic service set (BSS) color that is sent by a first STA, wherein the BSS color is to be used by the second STA in a device-to-device (D2D) transmission with the first STA, and wherein the BSS color is set to be a first color that is preconfigured for D2D transmission, wherein the first color is different from a second color allocated by an access point (AP) associated with the first STA for transmission with the AP, and wherein the first color is used for D2D transmissions between the first STA and other STAs in addition to the first color being used for D2D transmission between the first STA and the second STA;
receiving, by the second STA, a data frame sent by the first STA in the D2D transmission, wherein the data frame comprises the BSS color that is the first color; and
determining, by the second STA, the BSS color to be used in the D2D transmission with the first STA.

8. The method according to claim 7, wherein the data frame is a high efficiency physical layer convergence procedure protocol data unit (HE PPDU), and the BSS color is carried in a BSS color field of the HE PPDU.

9. The method according to claim 7, wherein before the receiving the data frame sent by the first STA, the method further comprises:
receiving, by the second STA, by using the AP, a first frame sent by the first STA.

10. The method according to claim 9, wherein the method further comprises:
sending, by the second STA, by using the AP, a TDLS setup response frame to the first STA, wherein the TDLS setup response frame comprises an acknowledgment message that acknowledges the BSS color.

11. The method according to claim 7, wherein the BSS color is used for an access point (AP) to determine whether spatial multiplexing can be performed, when a transmission frame including the BSS color is received.

12. The method according to claim 7, wherein the BSS color of each pair of STAs of D2D transmission is same.

13. A first station (STA), comprising:
a non-transitory memory storage comprising instructions; and
one or more hardware processors in communication with the non-transitory memory storage, wherein the one or more hardware processors execute the instructions to:
set, by the first STA, a basic service set (BSS) color to be used by a second STA in a device-to-device (D2D) transmission with the first STA, wherein the first STA sets the BSS color to be a first color that is preconfigured for D2D transmission, wherein the first color is different from a second color allocated by an access point (AP) associated with the first STA for transmission with the AP, and wherein the first color is used for D2D transmissions between the first STA and other STAs in addition to the first color being used for D2D transmission between the first STA and the second STA; and
generate a data frame that comprises the BSS color that is the first color; and a transmitter, configured to send the data frame to the second STA in the D2D transmission.

14. The first STA according to claim 13, wherein the data frame is a high efficiency physical layer convergence procedure protocol data unit (HE PPDU), and the BSS color is carried in a BSS color field of the HE PPDU.

15. The first STA according to claim 13, wherein the transmitter is further configured to:
send, by using the AP, a first request frame to the second STA.

16. The first STA according to claim 15, wherein the first STA further comprises:
a receiver, configured to receive, by using the AP, a TDLS setup response frame sent by the second STA, wherein the TDLS setup response frame comprises an acknowledgment message that acknowledges the BSS color.

17. The first STA according to claim 15, wherein the first frame is a Tunneled Direct Link Setup (TDLS) setup request frame.

18. The first station according to claim 13, wherein the BSS color is used for an access point (AP) to determine whether spatial multiplexing can be performed, when a transmission frame including the BSS color is received.

19. The first station according to claim 13, wherein the BSS color of each pair of STAs of D2D transmission is same.

20. A second station (STA), comprising:
a receiver, configured to
receive, a basic service set (BSS) color to be used by the second STA in a device-to-device (D2D) transmission with a first STA, wherein the BSS color is set to be a first color that is preconfigured for D2D transmission, wherein the first color is different from a second color allocated by an access point (AP) associated with the first STA for transmission with the AP, and wherein the first color is used for D2D transmissions between the first STA and other STAs in addition to the first color being used for D2D transmission between the first STA and the second STA; and
receive a data frame sent by the first STA in the D2D transmission, wherein the data frame comprises the BSS color that is the first color;
a non-transitory memory storage comprising instructions; and
one or more hardware processors in communication with the non-transitory memory storage, wherein the one or more hardware processors execute the instructions to:
determine the BSS color to be used in the D2D transmission with the first STA.

21. The second station according to claim 20, wherein the data frame is a high efficiency physical layer convergence procedure protocol data unit (HE PPDU), and the BSS color is carried in a BSS color field of the HE PPDU.

22. The second station according to claim 20, wherein the receiver is further configured to
receive, by using the AP, a first frame sent by the first STA.

23. The second STA according to claim 22, wherein the second STA further comprises:
a transmitter, configured to send a Tunneled Direct Link Setup (TDLS) setup response frame to the first STA by using the AP, wherein the TDLS setup response frame comprises an acknowledgment message that acknowledges the BSS color.

24. The second STA according to claim 22, wherein the first frame is a Tunneled Direct Link Setup (TDLS) setup request frame.

25. The second station according to claim 20, wherein the BSS color is used for an access point (AP) to determine whether spatial multiplexing can be performed, when a transmission frame including the BSS color is received.

26. The second station according to claim 20, wherein the BSS color of each pair of STAs of D2D transmission is same.

* * * * *